US005555505A

United States Patent [19]

Oosawa et al.

[11] Patent Number: 5,555,505

[45] Date of Patent: Sep. 10, 1996

[54] SEWING TREATMENT AND MANAGEMENT SYSTEM USING ELECTRONIC DATA PROCESSING APPARATUS

[75] Inventors: Akira Oosawa, Yokohama; Chiaki Miyasaka, Tokyo; Yasuyuki Ogura, Sagamihara; Toshihito Kouchi, Tokyo; Shinichi Yoshii, Urawa, all of Japan

[73] Assignee: Olympus Optical Co., Ltd., Tokyo, Japan

[21] Appl. No.: 345,541

[22] Filed: Nov. 28, 1994

Related U.S. Application Data

[63] Continuation of Ser. No. 56,064, Apr. 30, 1993, abandoned.

[30] Foreign Application Priority Data

Apr. 30, 1992 [JP] Japan .................................... 4-111224
Mar. 18, 1993 [JP] Japan .................................... 5-058899

[51] Int. Cl.[6] ...................................................... G06F 19/00

[52] U.S. Cl. ...................... 364/470.07; 364/131; 395/600

[58] Field of Search .................................... 364/468, 470, 364/401–403, DIG. 1 MS File, DIG. 2MS File, 131–134; 395/903, 904, 919, 600

[56] References Cited

U.S. PATENT DOCUMENTS

| | | | |
|---|---|---|---|
| 4,212,057 | 7/1980 | Devlin et al. | 364/200 |
| 4,479,446 | 10/1984 | Johnson et al. | 112/121.12 |
| 4,546,434 | 10/1985 | Gioello | 364/300 |
| 4,548,142 | 10/1985 | Peck | 112/121.12 |
| 4,835,699 | 5/1989 | Mallard | 364/470 |
| 5,016,183 | 5/1991 | Shyong | 364/468 X |
| 5,034,897 | 7/1991 | Sainen | 364/470 |
| 5,046,013 | 9/1991 | Ueda et al. | 364/470 |
| 5,119,318 | 6/1992 | Paradies et al. | 364/468 X |
| 5,124,928 | 6/1992 | Aemmer | 364/470 |
| 5,225,988 | 7/1993 | Barea | 364/470 |
| 5,233,534 | 8/1993 | Osthus et al. | 364/470 X |
| 5,276,896 | 1/1994 | Rimmer et al. | 395/800 |

FOREIGN PATENT DOCUMENTS 4-108133 4/1992 Japan .

OTHER PUBLICATIONS

Asano; "Japan's Distribution System Information Network"; 1990; pp. 3–15; Japan Computer Quarterly, No. 83.
G. Forger; "Slashing Lead Times with Quick Response"; Jul. 1989; pp. 77–78; Modern Materials Handling, vol. 44, No. 8.
I. P. Krepchin; "Linking MRP II with Product Design"; Mar. 1987; U.S., pp. 99–101; Modern Materials Handling, vol. 42, No. 3.
"In Full Swing, JICFS Operations Enhance Marked Efficiency"; Sep. 1991; pp. 44–45; OEP. Office Equipment and Products, vol. 20, No. 156, Japan.
"Apparel Business Sews Up New Information System", Sep. 1991; Japan, p. 47; OEP. Office Equipment and Products, vol. 20, No. 156.

*Primary Examiner*—Joseph Ruggiero
*Attorney, Agent, or Firm*—Frishauf, Holtz, Goodman, Langer & Chick

[57] ABSTRACT

A first terminal data processing unit is arranged in an apparel planning division to process first data necessary to plan an apparel goods. A second terminal data processing unit is arranged in a sewing division to process second data necessary to perform a sewing treatment and management of the apparel goods planned by the apparel planning division. A central data processing unit is connected to the first and second terminal data processing units through communication lines, respectively, and is arranged in an information service division to offer the first and second data to the apparel planning division and the sewing division. A database is connected to the central data processing unit to store at least the first and second data. The information service division supplies the second data, read out from the database by the central data processing unit, to the sewing division through the second terminal data processing unit, so that the sewing division can perform a sewing treatment and management of the apparel goods in accordance with electronic data processing.

24 Claims, 11 Drawing Sheets

SEWING TREATMENT AND MANAGEMENT SYSTEM USING ELECTRONIC DATA PROCESSING APPARATUS

This application is a continuation of U.S. patent application Ser. No. 08/056,064, filed Apr. 30, 1993, abandoned.

BACKGROUND OF THE INVENTION

1. Field of the Invention

The present invention relates to a sewing treatment and management system using an electronic data processing apparatus and, more particularly, to a sewing treatment and management system using an electronic data processing apparatus having a database integrated by a computer network for electronically processing data necessary in the manufacture of apparel goods in an information service network open to the entire apparel industry.

The present invention also relates to a sewing division assistance system using an electronic data processing apparatus having a database integrated by a computer network for electronically processing data associated with a textile and its raw materials in an information service network open to the entire apparel industry.

2. Description of the Related Art

For example, in an apparel industry where small-quantity, large-variation apparel goods such as female dresses, i.e., dresses which tend to gain or lose popularity, are handled, a sewing treatment division located downstream of the apparel industry manually performs only a sewing treatment in accordance with an instruction from an apparel planning division located upstream of the apparel industry.

More specifically, the sewing division has received a minimum quantity of data required for the sewing treatment on the basis of the traditional practice. For this reason, productivity is low in view of the sewing treatment and management, and the improvement of quality of apparel goods is limited.

Each sewing division has pre- and post-processes accompanying the sewing-process, and systematic management is not performed between the respective sewing divisions. In other words, the respective sewing divisions involve individual managing operations. The standards of jobs and management are not clear, and efficiency is degraded.

Conventionally, each sewing company rarely has a direct business transaction or gets in touch with a fabric company or a raw textile material company in accordance with the particular traditional practice in this industrial field. Under these circumstances, it is difficult for the sewing company to access data (including data of the raw textile material) associated with the manufacture of the textile. The sewing company has no chance to involve in manufacturing planning and management and involve with the physical properties for the textile and the raw textile materials. It is almost impossible for the sewing company to select an optimal textile company and an optimal raw textile company in accordance with its own decision.

In the apparel industry, a business promotion to meet the needs of the times has been attempted using an electronic data processing apparatus utilizing a so-called VAN (Value-Added Network).

This attempt is limited within each business enterprise initiated by the apparel side and is not extended to the sewing treatment and management and then the textile and raw textile materials.

As described above, conventionally, the sewing company cannot grasp physical properties of textile or manufacturing planning and management including an order process by its own decision for the textile and raw textile materials. The sewing operation is greatly delayed due to the delay of delivery of the textile. The sewing company frequently receives returned goods from apparel companies due to the loss of sales opportunities of the apparel companies or undesirably has a large quantity of stock.

The sewing company cannot select concerns handling the textile and raw textile materials by its own decision due to the traditional practice. For this reason, even if the textile used for the sewing treatment is inappropriate, a change in textile cannot be requested.

This bad practice is based on a main cause in which data associated with the manufacturing planning of the textile is not supplied to the sewing company. Even in a conventional closed electronic data processing system using a VAN in the apparel industry, data groups to be supplied to sewing companies are not properly stored, and a database managed by a computer network which integrates the data groups is not utilized.

A conventional apparel industry does not have a system for properly offering sewing and management data of apparel goods to sewing divisions.

SUMMARY OF THE INVENTION

The present invention has been made in consideration of the above situation, and has as its object to realize a sewing treatment and management system using an electronic data processing apparatus capable of properly offering sewing and management data of apparel goods to sewing divisions, thereby contributing to improvements of productivity of the sewing divisions and quality of apparel goods.

The present invention also has been made in consideration of the above situation, and has its another object to provide a sewing division assistance system using an electronic data processing apparatus having a database integrated by a computer network capable of causing a sewing division as a member of an information service network open to the apparel industry to select an optimal concern from textile and raw textile material concerns, and capable of effectively performing manufacturing planning, management and the like in accordance with electronic processes.

According to a first aspect of the present invention, there is provided a sewing treatment and management system comprising:

first terminal data processing means, arranged in an apparel planning division, for processing first data necessary to plan apparel goods;

second terminal data processing means, arranged in a sewing division, for processing second data necessary to perform a sewing treatment and management of the apparel goods planned by the apparel planning division;

central data processing means, connected to the first and second terminal data processing means through communication lines, respectively, and arranged in an information service division, for offering the first and second data to the apparel planning division and the sewing division; and database means, connected to the central data processing means, for storing at least the first and second data, wherein the information service division supplies the second data, read out from the database means by the central data processing means, to the sewing division through the second terminal data processing means, so that the sewing division can perform a sewing treatment and management of the apparel goods in accordance with electronic data processing.

According to a second aspect of the present invention, there is provided a sewing division assistance system comprising:

at least one first terminal data processing means, arranged in a sewing division, for processing first data necessary to perform a sewing treatment and management of an apparel goods to be sewed;

a plurality of second terminal data processing means, arranged in a plurality of textile selling divisions, for processing second data necessary to sell apparel textiles, respectively;

a plurality of third terminal data processing means, arranged in a plurality of textile manufacturing divisions, for processing third data necessary to manufacture the apparel textiles, respectively;

central data processing means, connected to the first to third terminal data processing means through communication lines, respectively and arranged in an information service division, for supplying the first to third data to the sewing division, the textile selling divisions, and the textile manufacturing divisions; and database means, connected to the central data processing means, for storing at least the first to third data, wherein the information service division supplies the second and third data, read out from the database means by the central data processing means and associated with the plurality of textile selling divisions and the plurality of textile manufacturing divisions, to the sewing division through the first terminal data processing means, so that the sewing division can select an optimal textile selling division and an optimal textile manufacturing division, and at the same time the sewing division is assisted to perform an order process, manufacturing planning, manufacturing management, and manufacturing designation in accordance with electronic data processing.

According to still another aspect of the present invention, there is provided an electronic data processing apparatus for a sewing treatment and management, comprising:

a central computer processing unit connected to be interactively accessible to terminals of at least one apparel company and one sewing division through corresponding communication lines; and a database, connected to the central computer processing unit, for inputting a series of data necessary to manufacture apparel goods planned by the apparel company, wherein among the series of data input to the database, data necessary for a sewing treatment and management of the apparel goods can be offered to the sewing division.

In the above arrangement, since the data necessary for the sewing treatment and management of the apparel goods is appropriately offered to the sewing division, the productivity of the sewing division and the quality of the apparel goods can be improved.

According to another aspect of the present invention, there is also provided an electronic data processing apparatus for a sewing treatment and management, wherein the central computer processing unit is connected to a terminal of an integrated processing center for collectively performing some processes associated with the sewing treatment and management of the apparel goods in addition to the above arrangement, and among the series of the data input to the database, the data necessary to perform some processes associated with the sewing treatment and management of the apparel goods is offered to the integrated processing center.

In the above arrangement, data necessary for some processes associated with the sewing treatment and their management is appropriately offered to the integrated processing center for collectively processing some processes associated with the sewing treatment of the apparel goods. Therefore, the productivity of the sewing treatment and the quality of the apparel goods can be improved.

According to still another aspect of the present invention, there is provided a sewing division assistance electronic data processing apparatus comprising:

a central computer processing unit connected to be interactively accessible to terminals of at least one sewing company, a plurality of textile selling companies, and a plurality of textile manufacturing companies through communication lines; and a master database, connected to the central computer processing unit, for inputting a series of data associated with textiles and raw textile materials to be manufactured or sold by thread, dyeing, and fabric companies as relating business fellows with at least the plurality of textile selling companies and at least the plurality of textile manufacturing companies, wherein when the master database is to be accessed from the terminal of the sewing company through the central computer processing unit, the series of data of the thread, dyeing, and fabric companies as the relating business fellows with the plurality of textile selling companies or textile manufacturing companies are sequentially accessed to select appropriate companies, and the sewing company is assisted to perform an order process, manufacturing planning, manufacturing management, and manufacturing designation of a textile which is suitable for the specifications of the apparel company and facilitates sewing in accordance with electronic processing.

In the above arrangement, when the sewing company accesses the master database through the central computer processing unit, the series of data of the respective companies as relating business fellows with the plurality of textile selling companies or the plurality of textile manufacturing companies are sequentially accessed to select the optimal companies. The sewing company also is assisted to perform the order process, manufacturing planning, manufacturing management, and manufacturing designation of the textile which is suitable for the specifications of the apparel company and facilitates sewing in accordance with the electronic processing.

According to another aspect of the present invention, there is provided a method for assisting a sewing treatment and management using an electronic data processing system, said method comprising the steps of:

storing data necessary to perform a sewing treatment and management of apparel goods in a database;

accessing the database to search desired data among the data stored in the database according to a request of a sewing division;

reading out the desired data from the database, and offering the desired data to the sewing division; and performing the sewing treatment and management based on the desired data at the sewing division, so that the sewing division can perform a desired sewing treatment and management of the apparel goods in accordance with electronic data processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
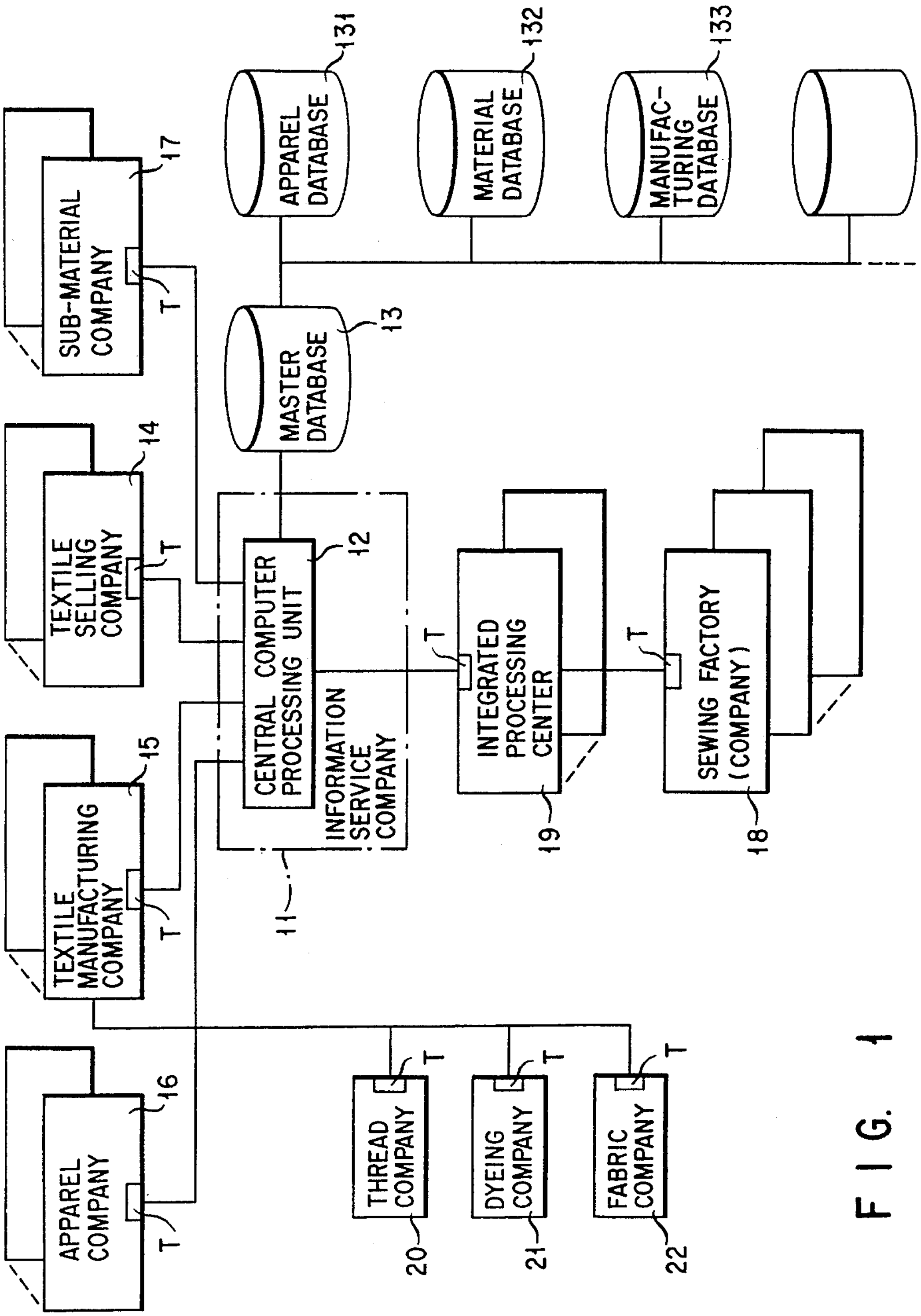
FIG. 1 is a block diagram of a sewing treatment and management system using an electronic data processing apparatus according to the first embodiment of the present invention.

Reference will now be made in detail to the presently preferred embodiments of the invention as illustrated in the accompanying drawings, in which like reference characters designate like or corresponding parts throughout the several drawings.

The first embodiment of the present invention will be described with reference to the accompanying drawings.

Referring to FIG. 1, reference numeral 11 denotes an information service company having a central computer processing unit 12 having a host computer as its main component to offer an information service network open to the entire apparel industry.

The central computer processing unit 12 is connected to a master database 13 to which data of the entire apparel industry are input.

The master database 13 is connected to an apparel database 131, a material database 132, and a manufacturing database 133, all of which will be described in detail later.

Terminals T of a textile selling company 14, a textile manufacturing company 15, an apparel company 16, a sub-material company 17, a sewing factory (company) 18, and an integrated processing center 19 (to be described in detail later), all of which are members of the information service company 11, are connected to the central computer processing unit 12 of the information service company 11 through appropriate communication lines such as telephone lines, thereby constructing an information service network.

Each terminal T may be an exclusive or general-purpose terminal having a modem. A peripheral device such as a printer in addition to a display may be connected to the terminal T.

The integrated processing center 19 is assumed as an integration company (consortium) for collectively performing pre- and post-processes of the sewing treatments of a plurality of sewing factories (companies) 18, as will be described in detail later. However, the integrated processing center 19 may be affiliated in the apparel company 16.

The plurality of textile selling companies 14, the plurality of textile manufacturing companies 15, the plurality of apparel companies 16, the plurality of sub-material companies 17, the plurality of sewing factories (companies) 18, and the plurality of integrated processing centers 19 may be included in the information service system in an actual application, part of which is illustrated in FIG. 1.

The textile manufacturing company 15 is assumed as an integration company (consortium) as a relating business fellow with the thread, dyeing, and fabric companies 20, 21, and 22 engaged in the various thread, dyeing, and fabric processes associated with the raw materials of the textile.

The terminals T of the companies 20, 21, and 22 are connected to each other through a so-called public line or the like. Data associated with manufacturing planning and management of these business fellows can be accessed by the textile manufacturing company 15.

The textile manufacturing company 15 may be constituted by one of the thread, dyeing, and fabric companies 20, 21, and 22.

All data associated with the respective stages in the manufacture and management of apparel goods in the companies 14, 15, 16, 17, and 18 and the integrated processing center 19 as the information service system members can be input beforehand to the databases 131 to 133 through the master database 13 connected to the central computer processing unit 12 in the information service company 11 or are input thereto in the form of each transaction (access).

Figure 2:
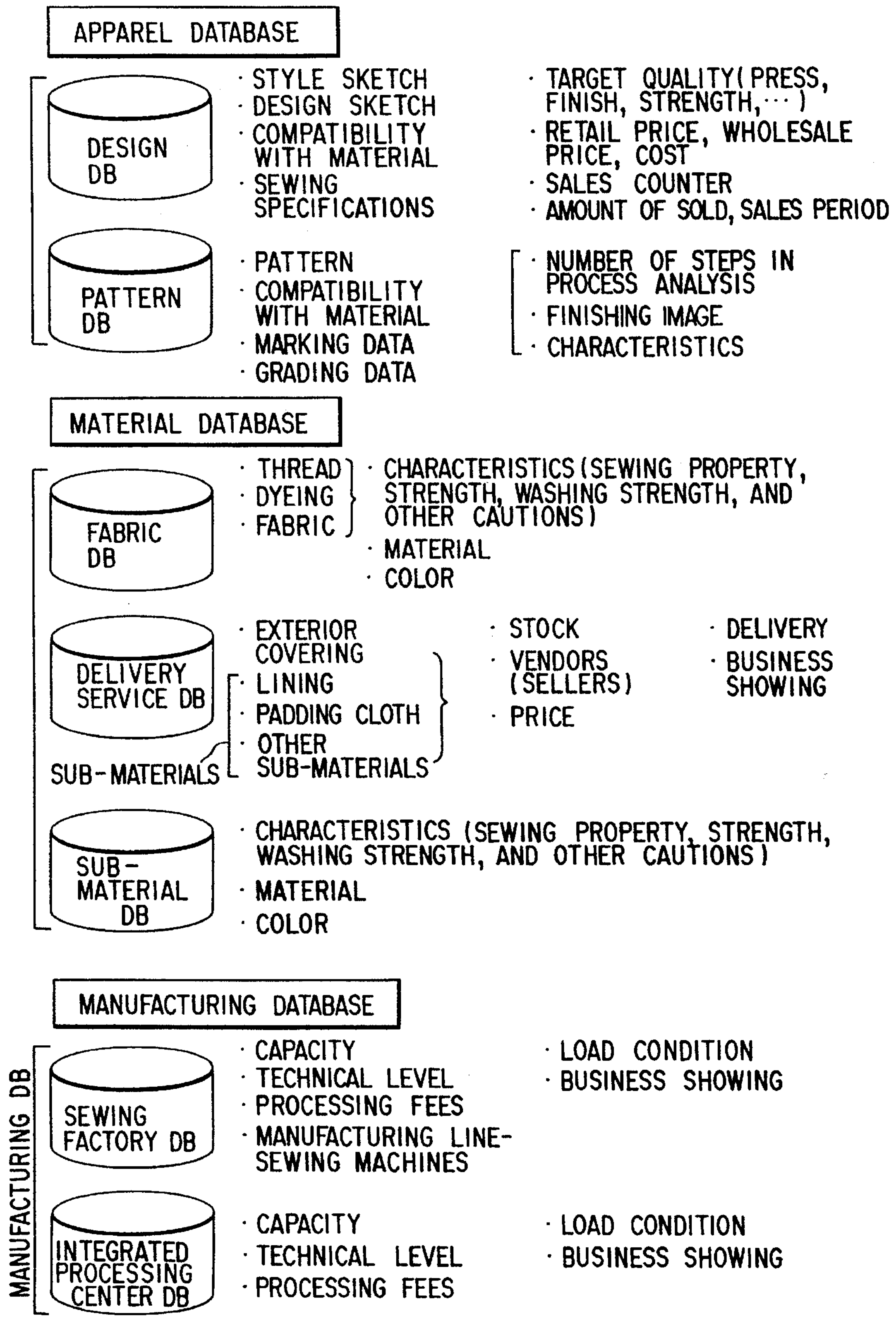
FIG. 2 is a view for explaining the construction contents of a database in FIG. 1.

FIG. 2 schematically explains each data input to the respective databases (to be referred to as DBs hereinafter) 131 to 133.

The apparel DB includes a design DB and a pattern DB.

The material DB includes a textile DB, a delivery service DB, and a sub-material DB.

The manufacturing DB includes a sewing factory (company) DB and an integrated processing center DB. The following past apparel design data and the like are input to the design DB:

Style sketch

Target quality (press, finishing, strength. . . )

Design sketch

Retail price, wholesale price, cost

Compatibility with material

Sales counter

Sewing specifications

Sales volume, sales period

The following past apparel pattern data and the like are input to the pattern DB:

Pattern

Number of steps in process analysis

Compatibility with material

Finishing image

Marking data

Characteristics

Grading data

The following past apparel textile data and the like are input to the textile DB:

Thread

Characteristics (flammability, strength, washing strengths, and other cautions)

Dyeing

Material

Fabric

Color

The following past apparel delivery service data and the like are input to the delivery service DB:

Exterior covering

Stock

Delivery

Lining

Vendor (seller)

Business showing

Padding cloth

Price

Other sub-materials

The following past apparel sub-material data and the like are input to the sub-material DB:

Characteristics (sewing properties, strength, washing strength, and other cautions)

Material

Color

The following past apparel sewing factory data and the like are input to the sewing factory DB:

Capacity

Load condition

Technical level

Business showing

Processing fees

Manufacturing line-sewing machines

The following past apparel integrated processing center data and the like are input to the integrated processing center DB:

Capacity

Load condition

Technical level

Business showing

Processing fees

To allow the apparel company 16 to plan apparel goods, the sewing company 18 to sew it, and the integrated processing center 19 arranged between the apparel company 16 and the sewing company 18 to collectively process the data and treat goods by using the information service network having the database associated with the manufacture and management of the apparel goods in the apparel industry, electronic processing is performed, as will be described with reference to FIGS. 3A and 3B.

Figure 3A:
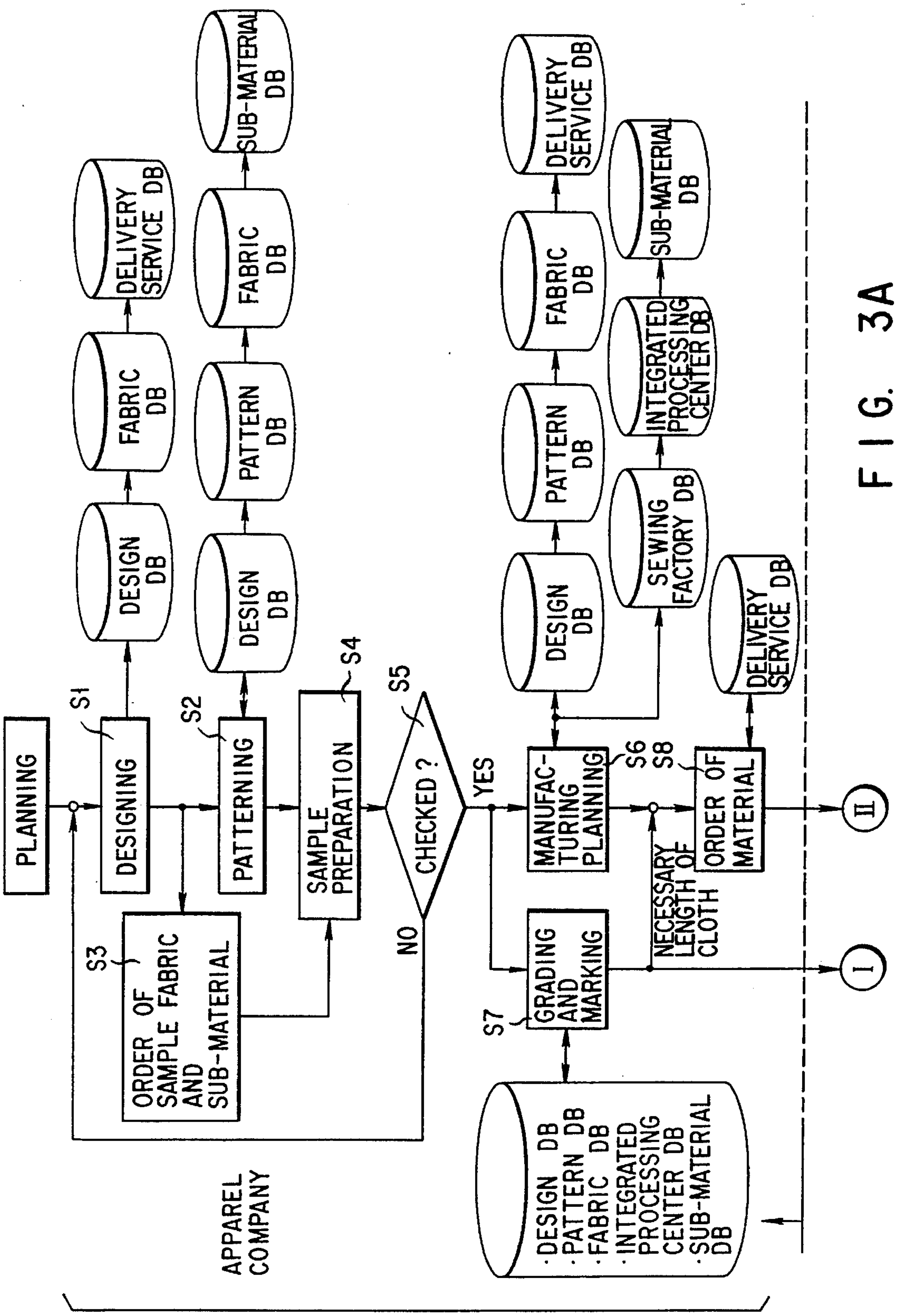
FIGS. 3A and 3B are flow charts for explaining an application of the system shown in FIG. 1.
Figure 3B:
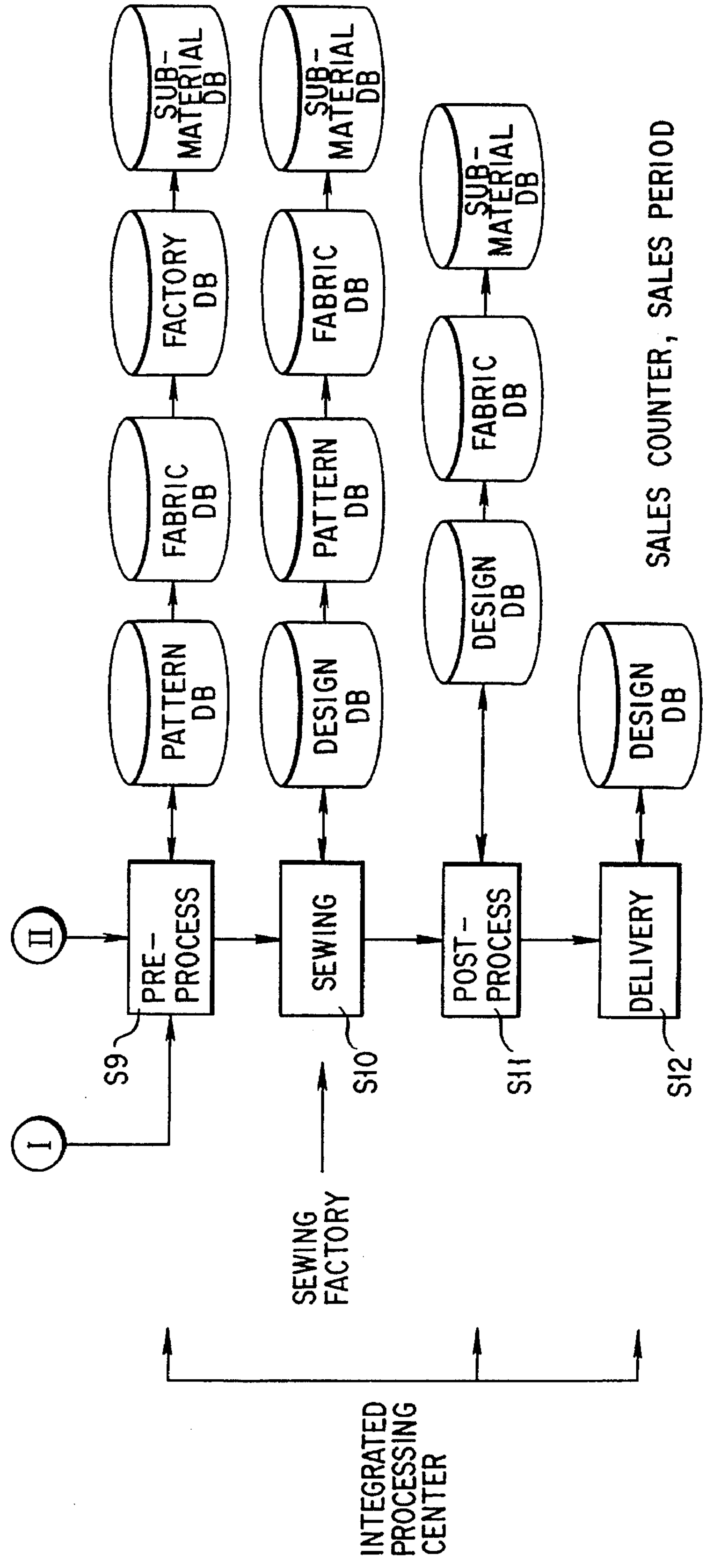

FIGS. 3A and 3B are flow charts showing an application of the network centered on the apparel company 16.

When a plan of apparel goods to be manufactured is drafted in the apparel company 16, designing is performed in step S1. For this purpose, a designer or operator accesses the network to search necessary data in the design DB, the textile DB, and the delivery service DB, so that data necessary for designing are immediately sent to electronically assist appropriate designing.

When the design is determined as described above, patterning for a so-called dress pattern is performed in step S2. In this case, search operations in the design DB, the pattern DB, the textile DB, and the sub-material DB are performed.

After the sample textile and sub-materials are ordered in step S3, the sample is prepared in step S4, and the sample is checked in step S5.

When preparation and check of the sample are completed as described above, manufacturing planning for preparing an actual goods is performed in step S6. In this case, search operations in the design DB, the pattern DB, the textile DB, and the delivery service DB are performed. At the same time, search operations in the sewing factory DB, the integrated processing center DB, and the sub-material DB are performed.

Meanwhile, grading for size variations and marking for cutting the textile for each graded size on the basis of the design pattern are performed. At this time, search operations in the design DB, the pattern DB, the textile DB, the integrated processing center DB, and the sub-material DB are performed.

As a result of grading and marking, the necessary length of cloth is determined, and the material is ordered in step S8. At this time, a search operation in the delivery service DB is performed.

Steps S1 to S8 are the processing contents of the apparel company 16.

Steps S9, S11, and S12 are a pre-process, a post-process, and a delivery process which are performed by the integrated processing center 19 on the basis of search operations of the necessary databases. In step S10, the sewing treatment by the sewing factory (company) 18 is performed on the basis of the search operations in the necessary databases.

Figure 4A:
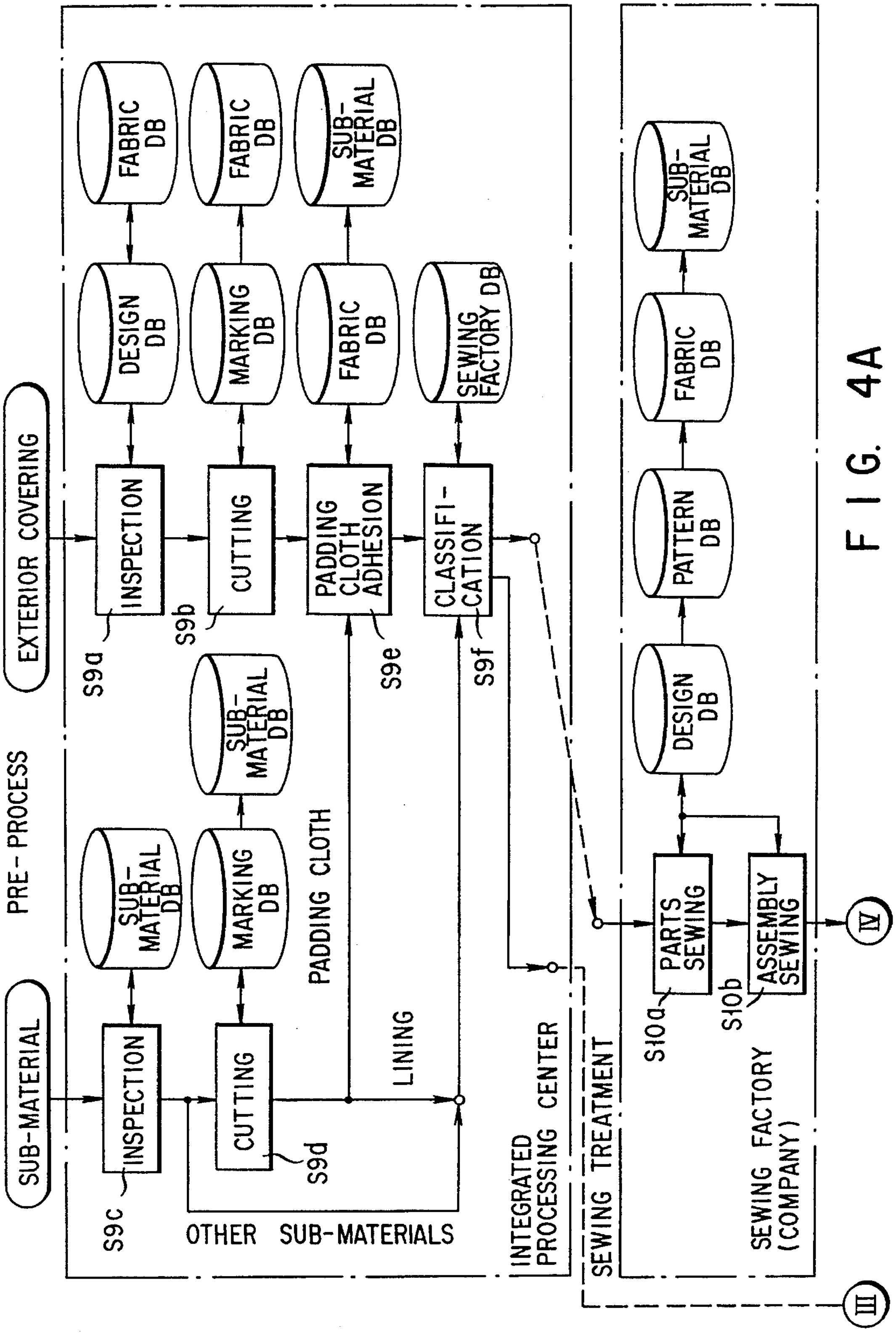
FIGS. 4A and 4B are views showing a detailed process of part of the system in FIG. 1.
Figure 4B:
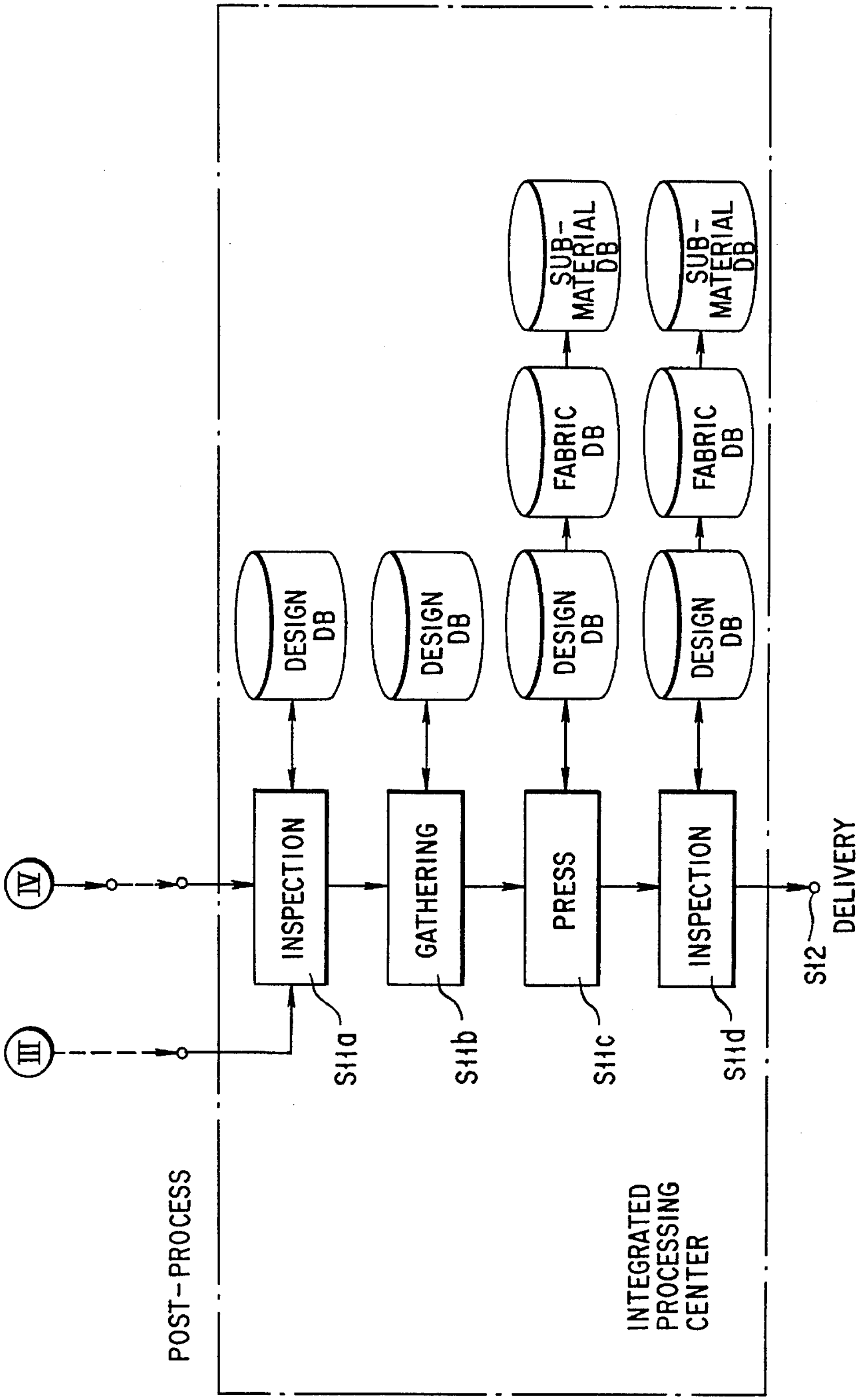

These processes will be described with reference to FIGS. 4A and 4B.

The pre-process is a process performed for the exterior covering and sub-materials which are ordered as the materials in step S8, In step S9*a*, exterior covering reception inspection called dry goods inspection is performed, and at this time, search operations in the design DB and the textile DB are performed.

In step S9*b*, the dry goods as exterior covering is cut. At this time, search operations in the marking DB and the textile DB are performed.

At the same time, the pre-process of the sub-materials is performed. The reception inspection of the sub-materials is performed in step S9*c*. At this time, a search operation in the sub-material DB is performed.

Subsequently, cutting of the sub-materials of the lining and padding cloth takes place in step S9*d*. In this case, search operations in the marking DB and the sub-material DB are performed.

The search operation in the marking DB is performed to retrieve grading and marking data.

The padding cloth cut in step S9*d* is pressed together with the exterior covering so as to perform so-called padding cloth adhesion. Search operations in the textile DB and the sub-material DB are performed to determine a press temperature in step 9*e*.

The respective cut parts and other sub-materials are classified in step S9*f*. In this case, a search operation in the sewing factory (company) DB is performed.

As described, the respective classified parts from the integrated processing center 19 to the predetermined sewing factory (company) 18 are sewed by the sewing factory (company) in step S10*a*. At this time, search operations in the design DB, the pattern DB, the textile DB, and the sub-material DB are performed.

Assembly sewing is performed in step S10*b*. In this case, search operations in the same databases as in step S10*a* are performed.

Data necessary for the sewing treatment are appropriately offered.

The assembled/sewed goods are delivered to the integrated processing center 19, and the integrated processing center 19 performs the following post-process.

The reception inspection of the assembled/sewed goods and their necessary sub-materials is performed in step S11*a*. At this time, a search operation in the design DB is performed.

In step S11*b*, so-called gathering is performed. A search operation in the design DB is performed.

In step S11*c*, finishing press is performed. In this case, search operations in the design DB, the textile DB, and the sub-material DB are performed.

In step S11*d*, total inspection is performed. In this case, search operations in the design DB, the textile DB, and the sub-material DB are performed. The non-defective goods are delivered in step S12.

As described above, necessary data can be appropriately provided in the pre- and post-processes of the sewing treatment and management.

As a result, as the data necessary for the processes, the treatment, and the management are appropriately provided from predetermined databases to the sewing treatment and the pre- and post-processes, the productivity in the sewing treatment and management can be improved, and the quality of the apparel goods can be greatly improved.

The pre- and post-processes of the sewing treatment and management can be controlled by the integrated processing center while searching data in the predetermined databases, thereby clarifying the job standards and achieving systematic management. Therefore, the productivity and quality of the sewing of the apparel goods can be further improved.

Figure 5:
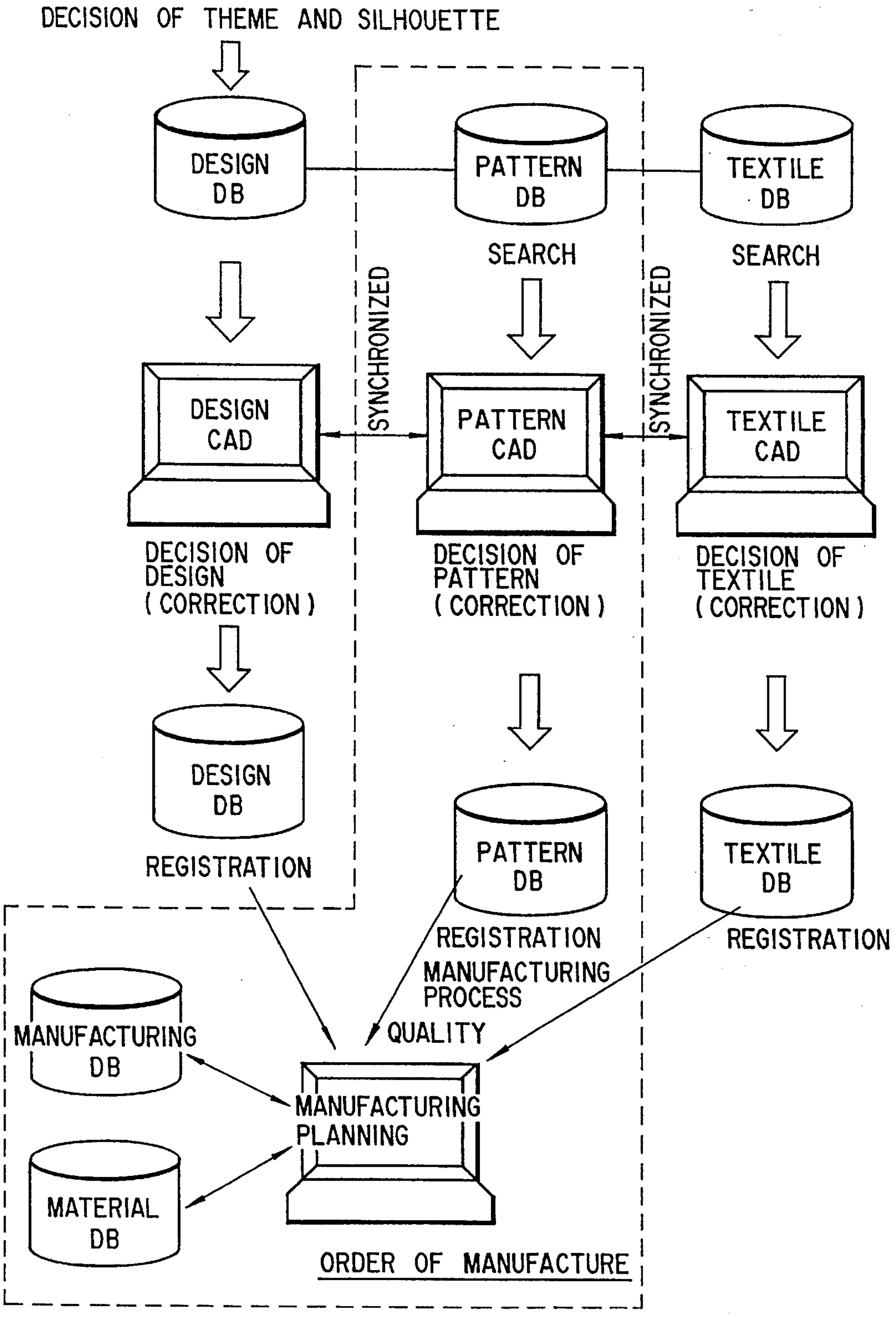
FIG. 5 is a view for explaining another application of the system in FIG. 1.

FIG. 5 shows another application of the manufacturing planning described above. As indicated by broken lines, manufacturing planning of apparel goods is performed centered on the search and correction (decision of pattern) of the pattern DB for re-registration.

More specifically, when the theme and silhouette of an apparel goods to be manufactured by the apparel company 16 are decided, search operations in the design DB, pattern DB, and the textile DB are performed.

In synchronized operations of the design CAD (Computer-Aided Design), the pattern CAD, and the textile CAD, the past registered data associated with the design, pattern, and textile are corrected to effectively decide an optimal design for the decided theme and silhouette, a pattern, and a textile.

The corrected data associated with the design, pattern, and textile are re-registered in the design DB, the pattern DB, and the textile DB. According to the characteristic feature of this embodiment, manufacturing planning is drafted and the goods manufacture is ordered on the basis of the re-registered data so as to manufacture an apparel goods having an optimal manufacturing process and high quality.

In drafting this manufacturing planning and ordering the goods, search operations in the material DB 132 and the manufacturing DB 133 are performed. In particular, data associated with the manufacturing capacities of the sewing factory and the integrated processing center and the load condition are searched.

In this application, the integrated processing center performs the pre- and post-processes of the sewing treatment. However, part of the entire sewing treatment including the process performed in the sewing factory (company) may be processed in an integrated manner.

As described above, according to the first embodiment of the present invention, data necessary for sewing and management of the apparel goods are appropriately supplied to the sewing treatment division, thereby realizing a sewing treatment and management system using an electronic data processing apparatus which can contribute to the improvements of productivity and quality of the sewing of the apparel goods.

The second embodiment of the present invention will be described in detail with reference to the accompanying drawings.

Figure 6:
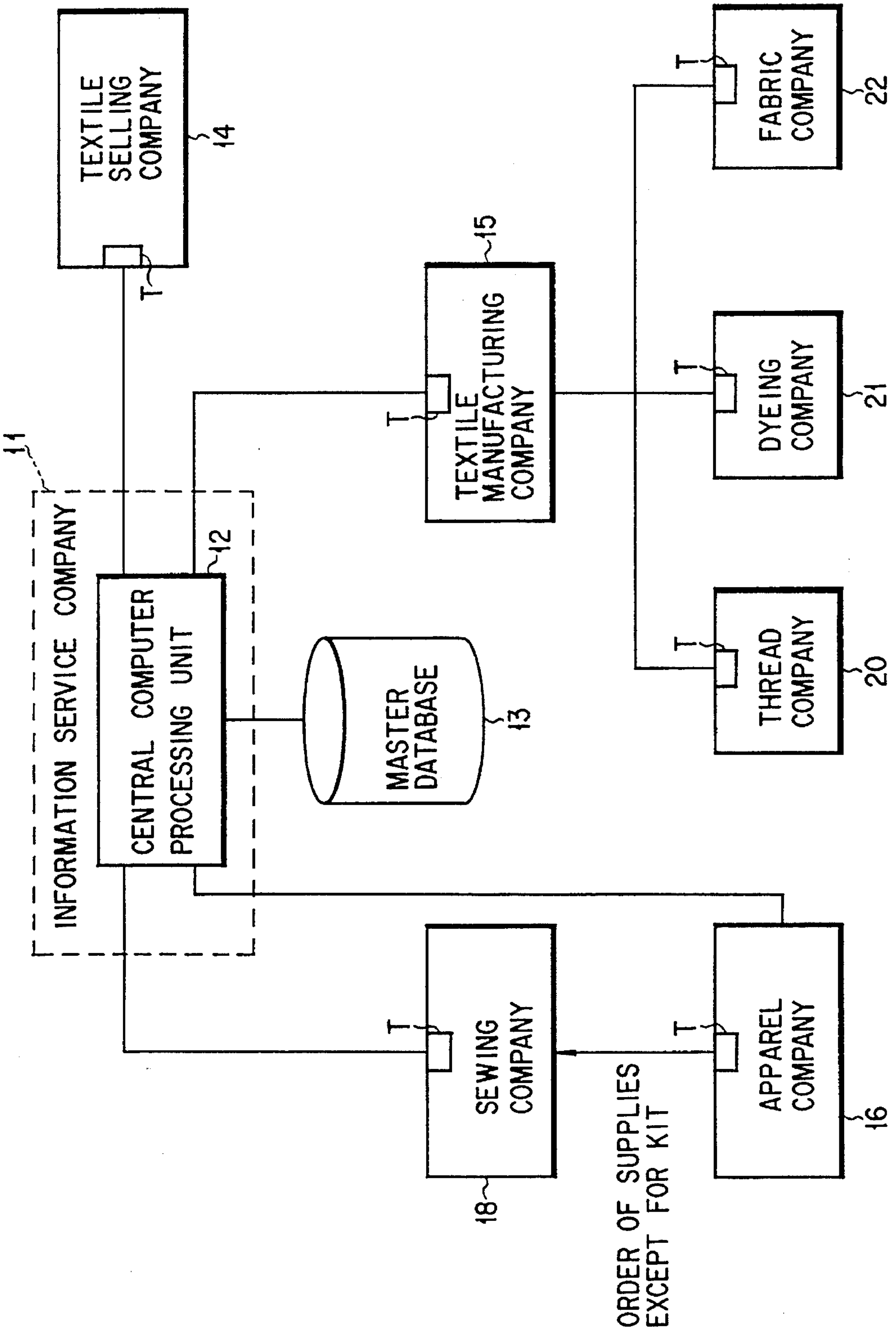
FIG. 6 is a block diagram showing a sewing division assistance system using an electronic data processing apparatus according to the second embodiment of the present invention.

Referring to FIG. 6, reference numeral 11 denotes an information service company which comprises a central computer processing unit 12 centered on a host computer to offer an information service network open to the entire apparel industry. The central computer processing unit 12 is connected to a master database 13 for storing data of the entire apparel industry, and particularly data of manufacturing planning and management of textiles.

Terminals T of a textile selling company 14, a textile manufacturing company 15, an apparel company 16, and a sewing company 18, all of which are members of the information service network of the information service company 11, are connected to the central computer processing unit 12 of the information service company 11 through appropriate communication lines to construct an information service network. Each terminal T may be an exclusive or general-purpose terminal having a modem. A peripheral device such as a printer in addition to a display may be connected to the terminal T.

Figure 7:
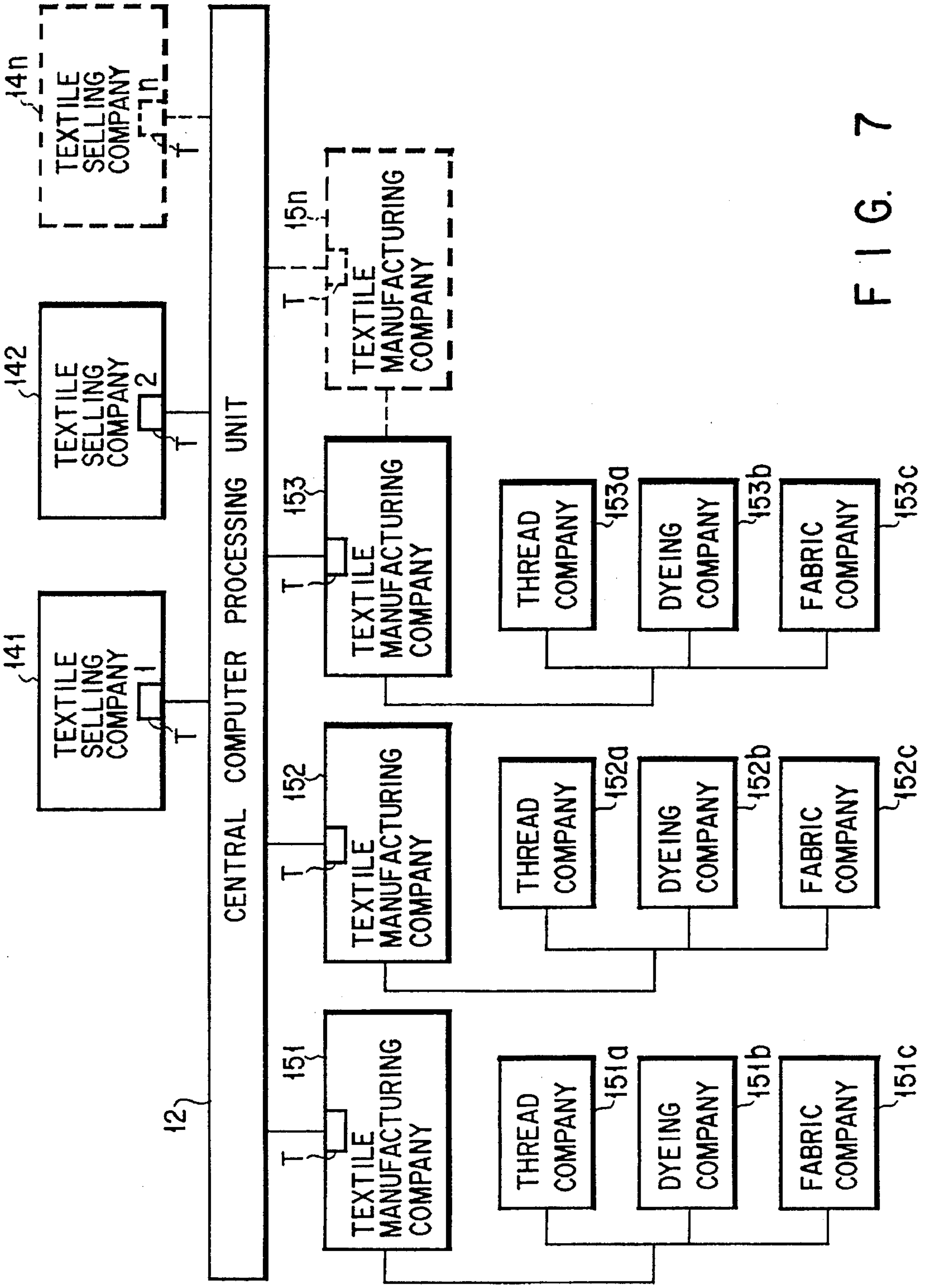
FIG. 7 is a view showing the detailed arrangement of the system in FIG. 6.

The plurality of textile selling companies 14, the plurality of textile manufacturing companies 15, the plurality of apparel companies 16, and the plurality of sewing companies 18 may be included in the information service system in an actual application, part of which is illustrated in FIG. 7.

The textile manufacturing company 15 is assumed as an integration company (consortium) as a relating business fellow with thread, dyeing, and fabric companies 20, 21, and 22 engaged in the various thread, dyeing, and fabric processes associated with the raw materials of the textile. The terminals T of the companies 20, 21, and 22 are connected to each other through a so-called public line or the like. Data associated with manufacturing planning and management of these business fellows can be accessed by the textile manufacturing company 15. The textile manufacturing company 15 may be constituted by one of the thread, dyeing, and fabric companies 20, 21, and 22.

All data associated with the respective stages in the manufacture and management of apparel goods in the companies 14, 15, 16, and 18 as the information service system members can be input beforehand to the master database 13 connected to the central computer processing unit 12 in the information service company 11 or are input thereto in the form of each transaction (access).

Figure 8:
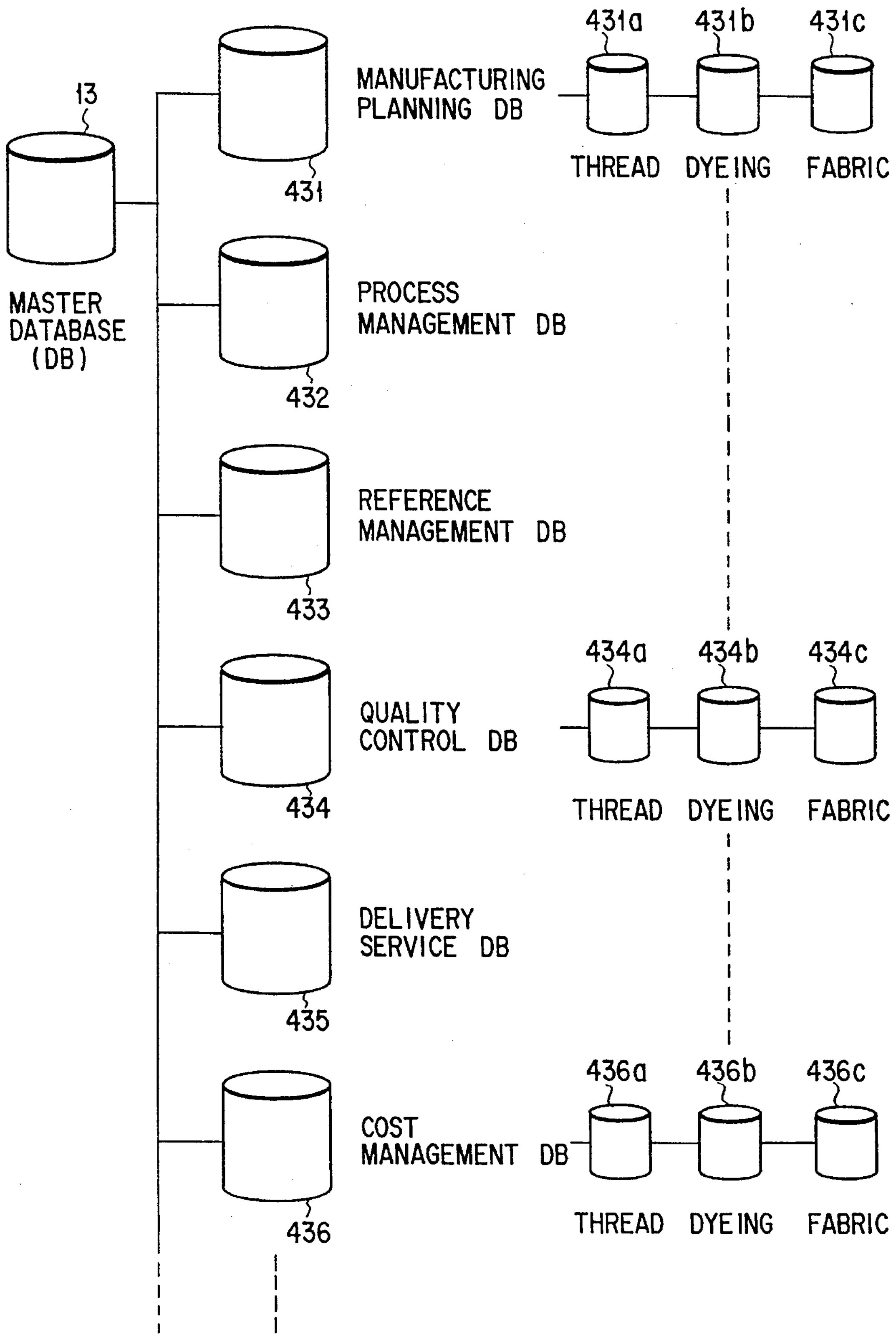
FIG. 8 is a view for explaining the construction contents of a master database in FIG. 6.

FIG. 8 is a view for generally explaining data input to the master database 13. This database includes a manufacturing planning database 431, a process management database 432, a material management database 433, a quality control database 434, a delivery service management database 435, and a cost management database 436. The databases 431 to 436 are constituted by databases 431*a*, 431*b*, and 431*c* to 436*a*, 436*b*, and 436*c* of lower levels associated with the thread, dyeing and fabric.

Several important data of all the data groups associated with threads, dyeing, and fabric, which are classified and input to the databases 13, 431 to 436, and 431*a*, 431*b*, and 431*c* to 436*a*, 436*b*, and 436*c* will be described below.

A: Thread

The data associated with threads include so-called Q, C, and D (Q: quality; C: cost; D: sales) data groups for clarifying a manufacturing cost, a manufacturing period, a specific amount of threads having specific quality coping with a specific degree of dyeing.

B: Dyeing

The data associated with dyeing include Q, C, and D data groups representing color variations, dyeing cost, and dyeing period.

C: Fabric

The data associated with fabric include Q, C, and D data groups for clarifying a specific textile width at a specific speed.

When textile code data and a plurality of companies are members of the information service system, the data associated with the thread, dyeing, and fabric include company code data and data representing whether access is performed.

Electronic processing of an order process, manufacturing planning, manufacturing management, manufacturing designation, and the like of a textile which is suitable for the order specifications of the apparel company and facilitates sewing will be described with reference to FIG. 9 when the sewing company 18 becomes a member of the information service network having a database associated with manufacturing planning, management, and the like of the textile in the apparel industry constructed as described above and uses the information service network.

Figure 9:
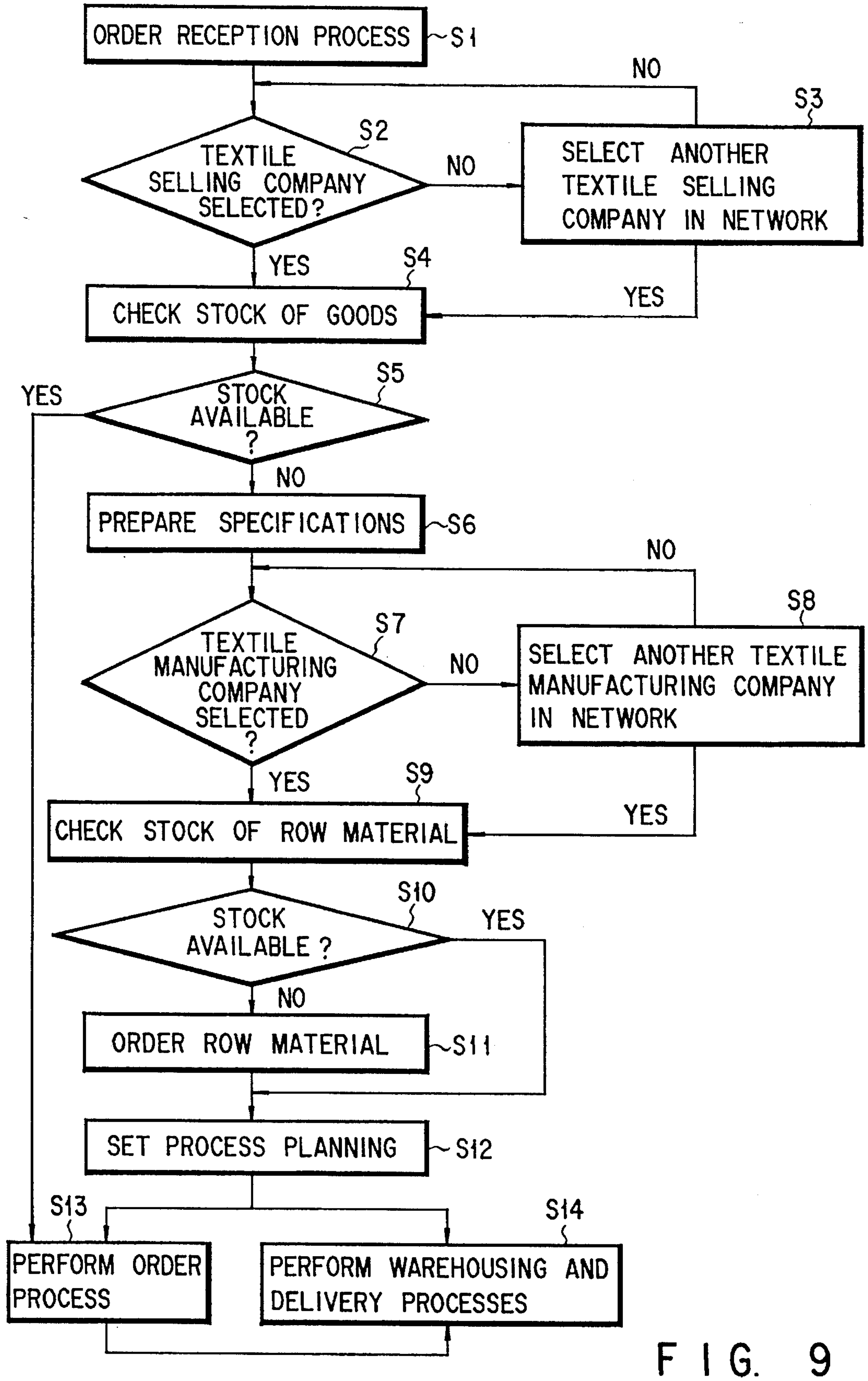
FIG. 9 is a flow chart for explaining an application of the system in FIG. 6.

FIG. 9 is a flow chart showing an application of the network by the sewing company 18.

In step S1, an operator in the sewing company 18 receives an order from the apparel company 16 and performs an order reception process. This order and order reception processes are performed as follows. The operator at the terminal of the apparel company 16 may directly access the central computer processing unit 12 of the information service company 11 to send order data to the terminal T of the sewing company 18 through the network, or a direct communication form using an electronic mail or the like except for the network may be used to arbitrarily send the order data. In either case, sewing materials including the textile except for the sub-materials called a kit (e.g., lining and buttons) of all the materials necessary for sewing clothes to be ordered to the sewing company 18 are ordered.

In step S2, the sewing company 18 accesses the network on the basis of textile code data input from the terminal T thereof to select a textile selling company. In this case, a list having a series of data representing textile selling companies which can sell the required textile and are registered in the master database 12 is sent to the terminal T of the sewing company 18. The sewing company 18 selects a textile selling company on the basis of this list.

In this case, if a first accessed textile selling company 141 cannot be immediately selected due to some reason such as cost and delivery, the sewing company 18 sequentially accesses other textile selling companies 142 to 14*n* within the network in step S3 and can select one textile selling company which is suitable for the specifications and large-variation, small-quantity production of the apparel company.

A description of access of the network by the sewing company 18 through the terminal T thereof will be omitted.

If the first textile selling company 141 is selected, the sewing company 18 checks in step S4 through the network whether the stock of a desired textile (goods) is available.

If it is determined in step S5 that the stock is available, the flow immediately advances to step S13, and the sewing company 18 performs an order process of this textile. This order process may be performed through the network or may use an arbitrary form using an electronic mail except for the network communication form.

If the absence of stock is determined in step S5, the flow advances to step S6, and the sewing company 18 prepares specifications (data) of the textile to be ordered and accesses the network. A list having a series of data of textile manufacturing companies which are registered in the master database 12 and can manufacture the required textile is sent back from the information service company 11. The sewing company 18 selects a desired textile manufacturing company 15 in step S7.

In selecting the textile manufacturing company 15, if a first accessed textile manufacturing company 151 cannot be immediately selected due to some reason such as cost and delivery, the sewing company 18 sequentially accesses other textile manufacturing companies 152 to 15*n* within the network in step S8 to select one textile manufacturing company which is suitable for the specifications and large-variation, small-quantity of the apparel company in the same manner as in selection of the textile selling company.

If the first textile manufacturing company 151 is selected, the sewing company 18 checks in step S10 through the network whether the stock of raw materials (threads, grey yarns, and dyes) of the desired textile is available.

When the presence of the stock is confirmed in step S10, the flow advances to step S12, and the sewing company 18 sets a process plan. In step S13, the sewing company 18 orders the raw material of the textile. In step S14, the sewing company 18 performs the warehousing and delivery processes in accordance with the progress of the process plan.

If the absence of the stock is determined in step S10, the flow advances to step S11, and the sewing company 18 performs a raw material order process including preparation of specifications (data) of the raw textile material to be ordered. In step S12, the sewing company 18 sets the process plan.

The process plan setup in step S12 will be described below.

The process plan setup is performed as follows when the presence of the stock is determined in step S10. Since the stock of the thread or grey yarn, dye and the like required for manufacturing the textile is available, the overall process plan is set to include a schedule that the thread or grey yarn and the dye are used, i.e., the thread from the thread company 20 is dyed with a dye from the dyeing company, and a desired textile is obtained using the dyed thread or the thread in the fabric company 22.

The process plan setup is performed as follows when the absence of the stock is determined in step S10. Since the stock of the thread or grey yarn and the dye required for manufacturing the textile is not available, the overall process plan is set to include a schedule that the thread company 20 and the dyeing company 21 can internally or externally access these raw materials. After the thread or grey yarn, the dye and the like are received, the same process plan as described above is set.

In practice, the process plan setup slightly varies depending on so-called yarn-dyeing (the threads are dyed, and a textile having a desired pattern is obtained using the dyed threads) and piece-dyeing (the thread is sewed using the thread, and a desired pattern is then printed). That is, in piece-dyeing, dyeing may be started upon confirmation of the stock of grey yarn.

The sewing company 18 drafts a process plan required for sewing on the basis of the sewing specifications designated by the apparel company 16 and practices the plan using the textile obtained from the sewing company 18. The finished clothes are delivered to the apparel company 16.

The warehousing and delivery processes in step S14 indicate the warehousing and delivery processes of the delivery service involving the delivery and warehousing of goods in the respective stages upon the order and order reception processes of the textile or raw textile materials among the sewing company 18, the textile selling company 141, and the textile manufacturing company 151 (the thread, dyeing, and fabric companies 20, 21, and 22). In this case, data processing of the warehousing and delivery inspections of the actual goods at the respective stages, payments, and goods reception is performed using the network.

The sewing company 18 which cannot engage with and initiate manufacturing planning and management of the textile is assisted to facilitate the manufacturing planning and management when the sewing company 18 becomes a member of the network of the information service company 11 having the electronic processing apparatus networked to electronically process the associated data.

When the sewing company 18 becomes a member of the information service network, manufacturing planning and management which have been entirely determined by the apparel maker can be performed by the sewing company 18 itself upon selection of optimal vendors. Therefore, the sewing company 18 is assisted by the network to perform all the operations from planning of clothes to its sewing with its own risk independently of the apparel maker.

On the other hand, the apparel company 16 can be free from manufacturing planning and management of the textile and can save the capital and labor.

The textile selling company 14 and the textile manufacturing company 15 (the thread, dyeing, and fabric companies 18, 19, and 20) can directly receive the order information about the sales and manufacture of the textile and the raw textile materials from the sewing company 18. The textile selling company 14 and the textile manufacturing company 15 have an advantage in terms of the date of delivery and are free from returned goods caused by defective goods, changes in the manufacturing process, and an excessive stock.

By using this network, sewing conditions for each textile are directly informed to the sewing company. Therefore, goods quality variations caused by textile properties can be minimized, and the number of defective goods can be reduced.

When members of the information service network repeatedly utilize the network, the data stored in the master database 13 are increased in number, and the quality of the master database 13 can be improved. Therefore, the information service company 11 can continuously offer better services including the management of the members to the members.

As has been described above, according to the second embodiment of the present invention, there can be provided a sewing division assistance system using an electronic processing apparatus having a database integrated by the computer network in which a sewing company as a member of the information service network open to the entire apparel industry can utilize the network to select an optimal company from the company group handling the textile and the raw textile materials and can effectively perform manufacturing planning and management in accordance with electronic processing.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A method for assisting sewing treatment and management using an electronic data processing system, said method comprising the steps of:

storing data necessary to perform sewing treatment and management of apparel goods in a database provided in an open information service network, the data including data obtained from a plurality of companies in an apparel industry which subscribe to the open information service network;

accessing the database to search for desired data among the data stored in the database according to a request of a sewing company as one of the plurality of companies, through the open information network;

reading out the desired data from the database, and supplying the desired data to the sewing company; and performing the sewing treatment and management based on the desired data at the sewing company, so that the sewing company performs a desired sewing treatment and management of the apparel goods in accordance with electronic data processing.

2. A method according to claim 1, wherein said sewing company includes an integrated processing division for collectively performing a pre-process operation associated with the sewing treatment and management.

3. A method according to claim 1, wherein said sewing company includes an integrated processing division for collectively performing a post-process operation associated with the sewing treatment and management.

4. A method according to claim 2, wherein:

the stored data includes data associated with at least one of a design, pattern and textile; and said pre-process operation includes the steps of:

correcting said stored data to effectively decide an optimal design for at least one of a decided theme, silhouette, pattern, and textile, and to form corrected data in accordance therewith, and re-registering said corrected data in the database.

5. A method according to claim 4, wherein said integrated processing division collectively performs a post-process operation associated with the sewing treatment and management.

6. A method according to claim 5, wherein said post-process operation includes the steps of:

drafting a manufacturing plan, and ordering the goods on the basis of the re-registered data so as to manufacture the apparel goods in an optimal process with high quality.

7. A sewing treatment and management system using an open information service network system provided by a central information service company and which network system is open to at least a plurality of independent apparel planning companies and a plurality of independent apparel sewing companies, the sewing treatment and management system comprising:

a database under control of said information service company, for storing at least first data necessary to plan apparel goods, and second data necessary to perform a sewing treatment and management of the apparel goods;

a central data processor, connected to said database, and under control of said information service company, for retrieving the first and second data from said database;

a plurality of first terminal data processors, which are connectable to said central data processor through communication lines, respectively, and which are arranged in a plurality of independent apparel planning companies which are subscribed to said open information service network system, for performing planning of the apparel goods by retrieving from said database the first data necessary for planning via said central data processor; and a plurality of second terminal data processors, which are connectable to said central data processor through communication lines, respectively, and which are arranged in a plurality of independent apparel sewing companies which are subscribed to said open information service network system, for performing a sewing treatment and management of apparel goods corresponding to a plan performed in at least one of the plurality of independent apparel planning companies which are subscribed to said open information service network system by retrieving from said database the second data necessary for the sewing treatment and management of the apparel goods via said central data processor;

wherein at least said plurality of independent apparel sewing companies which are subscribed to said open information service network system are assisted so as to perform the sewing treatment and management of the apparel goods in accordance with electronic data processing by said open information service network system.

8. A system according to claim 7, wherein said system further comprises:

third terminal data processing means, arranged in an integrated processing division, for processing third data necessary for collectively processing some processes associated with the sewing treatment and management of the apparel goods planned by said apparel planning division and wherein:

said central data processing means is connected to said third terminal data processing means through a communication line, said database means stores the third data, and said information service division supplies the third data, read out from said database means by said central data processing means, to said integrated processing division through said third terminal data processing means.

9. A system according to claim 7, wherein said database means comprises at least an apparel database, a material database, and a manufacturing database.

10. A system according to claim 9, wherein said apparel database comprises at least a design database and a pattern database, said design database stores a series of data associated with apparel design, and said pattern database stores a series of data associated with an apparel pattern.

11. A system according to claim 9, wherein said material database comprises at least a textile database, a delivery service database, and a sub-material database, said textile database stores a series of data associated with an apparel textile, said delivery service database stores a series of data associated with an apparel delivery service, and said sub-material database stores a series of data associated with apparel sub-materials.

12. A system according to claim 9, wherein said manufacturing database comprises at least a sewing division database and an integrated processing division database, said sewing division database stores a series of data associated with an apparel sewing division, and said integrated processing division database stores a series of data associated with an apparel integrated processing division.

13. A system according to claim 8, wherein the third data includes data necessary for collectively processing a pre-process associated with the sewing treatment and management of the apparel goods planned by said apparel planning division.

14. A system according to claim 8, wherein the third data includes data necessary for collectively processing a post-process associated with the sewing treatment and management of the apparel goods planned by said apparel planning division.

15. A system according to claim 10, wherein said apparel planning division executes manufacturing planning of the apparel goods in accordance with processing of the data stored in said pattern database and selected from the first data supplied from said central data processing means through said first terminal data processing means.

16. The sewing treatment and management system according to claim 7, wherein said plurality of independent apparel planning companies which are subscribed to said open information service network system are further assisted so as to perform a planning of the apparel goods in accordance with electronic data processing by said open information service network system.

17. A sewing assistance system using an open information service network system provided by a central information service company and which network system is open to at least a plurality of independent apparel sewing companies and a plurality of independent textile selling companies and manufacturing companies, the sewing assistance system comprising:

a database under control of said information service company, for storing at least first data necessary to perform a sewing treatment and management of apparel goods to be sewed, and second and third data necessary to perform selling and manufacturing of apparel textiles used for the apparel goods;

a central data processor, connected to said database, and under control of said information service company, for retrieving the first, second, and third data from said database;

a plurality of first and second terminal data processors, connectable to said central data processor through communication lines, respectively, and which are arranged in a plurality of independent textile selling companies and textile manufacturing companies which are subscribed to said open information service network system, for performing selling and manufacturing of the apparel textiles by retrieving from said database the second and third data necessary for selling and manufacturing of the apparel textiles via said central data processor; and at least one third terminal data processor which is connectable to said central data processor through communication lines, and which is arranged in at least one of the plurality of independent apparel sewing companies which are subscribed to said open information service network system, for selecting a most suitable textile selling company and textile manufacturing company from said plurality of independent textile selling companies and textile manufacturing companies which are subscribed to said open information service network system, and for performing a sewing treatment and management of the apparel goods, by retrieving from said database the first data necessary for the sewing treatment and management of the apparel goods and the second and third data necessary to perform the selling and manufacturing of apparel textiles used for the apparel goods via said central data processor, wherein said at least one of the plurality of independent apparel sewing companies which are subscribed to said open information service network system is assisted so as to perform at least one of an order process, manufacturing planning, manufacturing management, and manufacturing designation associated with a textile which is suitable for a specification of the apparel goods and facilitates sewing in accordance with electric data processing by said open information service network system.

18. A system according to claim 7, wherein at least one of the second and third data stored in said database means includes data associated with a textile and a raw textile material which can be manufactured and sold by thread, dyeing, and fabric divisions related to at least one of said plurality of textile selling divisions and said plurality of textile manufacturing divisions.

19. A system according to claim 1, wherein said database means includes a manufacturing planning database, a process management database, a reference management database, a quality control database, a delivery service management database, and a cost management database.

20. A system according to claim 11, wherein each database includes a database group for storing lower-level data associated with a thread, a dye, and a fabric.

21. A system according to claim 20, wherein the data associated with the thread, the dye, and the fabric include a data group associated with quality, a price, and sales.

22. An electronic data processing apparatus for a sewing treatment and management system using an open information service network system provided by a central information service company and which network system is open to at least a plurality of independent apparel planning companies and a plurality of independent apparel sewing companies, the electronic data processing apparatus comprising:

a database under control of said information service company, for inputting a series of data necessary to plan and manufacture apparel goods;

a central data processing unit, connected to said database, and under control of said information service company, for retrieving the series of the data necessary to plan and manufacture the apparel goods;

a first terminal connectable to said central data processing unit through a communication line, and which is arranged in at least one of a plurality of independent apparel planning companies which are subscribed to said open information service network system, for performing planning of the apparel goods by retrieving from said database the data necessary for planning of the apparel goods via said central data processing unit; and a second terminal, connectable to said central data processing unit through a communication line, and which is arranged in at least one of a plurality of independent apparel sewing companies which are subscribed to said open information service network system, for performing a sewing treatment and management of the apparel goods by retrieving from said database the data necessary for the sewing treatment and management of the apparel goods via said central data processing unit, wherein said at least one of the plurality of independent apparel sewing companies which are subscribed to said open information service network system is assisted so as to perform the sewing treatment and management of the apparel goods, in accordance with electronic data processing by said open information service network system.

23. An apparatus according to claim 22, wherein a terminal of an integrated processing center for collectively performing some processes associated with the sewing treatment and management of the apparel goods is further connected to said central data processing unit, and among the series of data input to the database, the data necessary to perform some processes associated with the sewing treatment and management the apparel goods is offered to said integrated processing center.

24. A sewing division assistance electronic data processing apparatus using an open information service network system provided by a central information service company and which network system is open to at least a plurality of independent apparel planning companies, a plurality of independent apparel sewing companies, a plurality of independent textile selling companies and manufacturing companies, and thread, dyeing, and fabric companies related within the plurality of independent textile selling companies and manufacturing companies, the sewing division assistance electronic data processing apparatus comprising:

a master database under control of said information service company, for inputting at least a series of first data associated with textiles and raw textile materials to be manufactured or sold by a plurality of independent textile selling companies and textile manufacturing companies, and thread, dyeing, and fabric companies related with the plurality of independent textile selling companies and the textile manufacturing companies each of which are subscribed to said open information service network system, and a series of second data needed by at least one of a plurality of independent apparel sewing companies which are subscribed to said open information service network system to perform an order process, manufacturing planning, manufacturing management, and manufacturing designation of a textile which is suitable for a specification of at least one of a plurality of independent apparel planning companies which are subscribed to said open information service network system and facilitates sewing in accordance with electronic processing;

a central data processing unit under control of said information service company, and which is connected to the master database, for retrieving first and second data therefrom;

a plurality of first, second, and third terminals, connectable to said central data processing unit through communication lines, respectively, and which are arranged in said plurality of independent textile selling companies and textile manufacturing companies which are subscribed to said open information service network system, and the thread, dyeing, and fabric companies, for performing selling and manufacturing of the textiles and raw textile materials to be manufactured or sold, by retrieving from the master database the first data via said central data processing unit; and at least one fourth terminal, connectable to said central data processing unit through a communication line, and which is arranged in said at least one of the plurality of independent apparel sewing companies which are subscribed to said open information service network system, for selecting suitable companies for providing a textile which is suitable for the specification of said at least one of the plurality of independent apparel planning companies which are subscribed to said open information service network system and for facilitating sewing from said thread, dyeing, and fabric companies, and for performing order process, manufacturing planning, manufacturing management, and manufacturing designation of the textile in accordance with electronic processing, based on the first and second data retrieved from said master database via said central data processing unit;

wherein when said at least one of the plurality of independent apparel sewing companies accesses the master data base through the central computer processing unit, the series of data of the respective companies as relating business follows with the plurality of independent textile selling companies or the plurality of independent textile manufacturing companies are sequentially accessed to select the optimal companies, so that said at least one of the plurality of independent apparel sewing companies is assisted to perform the order process, manufacturing planning, manufacturing management, and manufacturing designation of the textile which is suitable for the specification of said at least one of the plurality of independent apparel planing companies and facilitates sewing in accordance with the electronic processing by said open information service network system.

* * * * *